March 12, 1968     E. E. GRAY     3,373,060
ELECTRICAL CELL WITH COILED SEPARATORS AND ELECTRODES
Filed Jan. 3, 1966
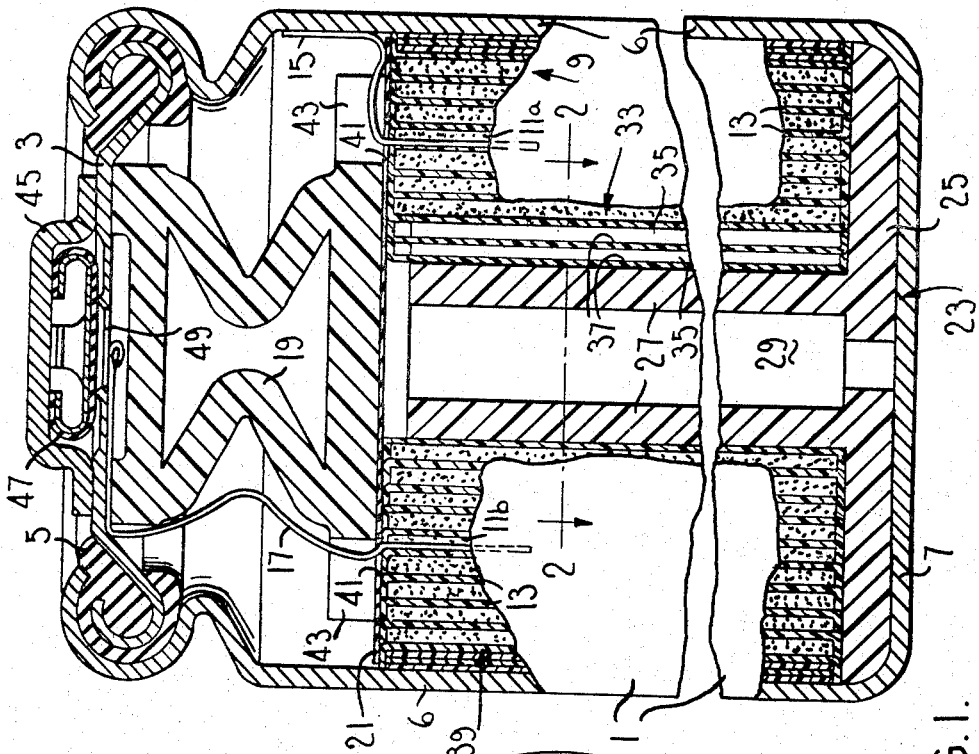
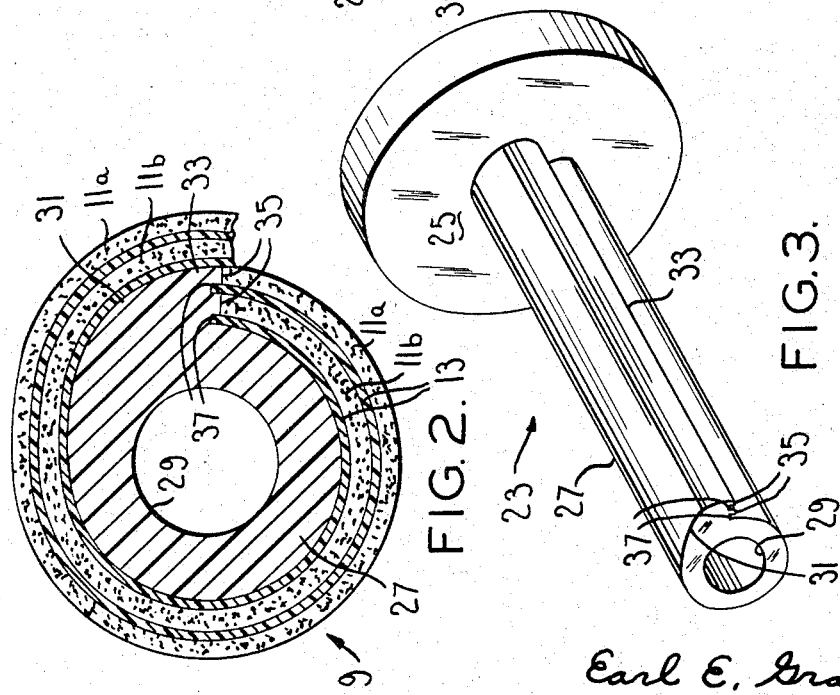
Earl E. Gray,
Inventor,
Koenig, Senniger, Powers and Leavitt,
Attorneys.

United States Patent Office 3,373,060
Patented Mar. 12, 1968

3,373,060
ELECTRICAL CELL WITH COILED SEPARATORS AND ELECTRODES
Earl E. Gray, North Attleboro, Mass., assignor to Texas Instruments Incorporated, Dallas, Tex., a corporation of Delaware
Filed Jan. 3, 1966, Ser. No. 518,218
10 Claims. (Cl. 136—100)

This invention relates to electrical cells, and more particularly to an electrode assembly for an electrical cell.

Among the several objects of the invention may be noted the provision of an electrode assembly for an electrical cell in which an intimate relationship is established and maintained between electrodes to insure a more uniform discharge and charge rate of the cell; the provision of such an electrode assembly of the so-called "jelly-roll" type; and the provision of an electrical cell incorporating such an electrode assembly which is virtually shake-proof and can be operated in any position. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a longitudinal section of an electrical cell of this invention;

FIG. 2 is an enlarged fragmentary transverse section on line 2—2 of FIG. 1; and

FIG. 3 is a perspective of an arbor per se of FIGS. 1 and 2.

Corresponding reference characters indicate corresponding parts throughout the several views of the drawings.

Referring to the drawings, first to FIG. 1, there is shown an electrical cell comprising a cylindric metal container 1 closed at its upper end by a metal cover 3. The container and cover are electrically conductive and they are connected together by an insulating seal 5. The container has a generally cylindric peripheral wall 6 and a circular bottom 7. Within the container is an electrode assembly generally designated 9 comprising a positive electrode 11a and a negative electrode 11b wound into a roll and separated by insulating separators 13. The positive electrode 11a is electrically connected to the wall of the container by a conductor 15. The negative electrode is electrically connected to cover 3 by a conductor 17. A spacer 19 is positioned between cover 3 and a disc 21 of insulation material on top of electrode assembly 9.

More particularly, assembly 9 includes an arbor 23 formed of insulating material such as polypropylene, nylon, acrylic resins, et cetera. The arbor is formed to have a circular base 25 and a mandrel or core 27 extending from the base. The mandrel is shown as hollow, but it could be solid. The circular base is dimensioned to fit in the container bearing against the bottom of the container. The axis X—X of the mandrel coincides with the central axis of the container 1. The periphery of the mandrel 27 is of spiral form, as indicated at 31 in FIGS. 2 and 3, providing an offset or shoulder 33 in a radial plane extending throughout the length of the mandrel. This offset preferably has two lands 35 and two recesses 37 extending its entire length. One of the lands is at the radially outer edge of the offset.

Electrode 11a consists of a flexible coilable strip of nickel, for example, electrode 11b consists of a flexible coilable strip of cadmium, for example, and separators 13 consist of flexible coilable strips of insulation material such as are conventionally used in making so-called "jelly-roll" electrical cells. The two separators and the two electrodes are wrapped around the mandrel with the separators alternating with the electrodes. In a coil of separators and electrodes there is a separator 13 next to mandrel 27, then negative electrode 11b, then another separator, then positive electrode 11a. This sequence is repeated throughout the thickness of the coil. One end of each of the two separators 13 lies within a respective recess 37. One end of each of the two electrodes abuts a respective land 35. This arrangement reduces the possibility of short circuiting between the electrodes at their offset end.

The separator strips 13 are wider than the electrode strips 11a and 11b, and the strips are tightly wound around the mandrel 27 to a diameter somewhat less than the inside diameter of the container wall 6. The electrodes and separators are compressed when they are wound on the mandrel to provide firm contact between the electrodes and the separators. Because of the intimate relation between the two electrodes, the cell is charged and discharged at a more uniform rate. The separators are made, for example, from a nylon felt insulation or other material which is permeable to electrolyte ions. A length of adhesive tape 39 is tightly wound around the spiraled assembly of separators and electrodes while they are under compression to hold them under compression. The outside diameter of the wound tape is only slightly less than the inside diameter of the container wall 6. The tape aids in controlling the size of the electrode assembly. Tape 39 comprises a carrier and an adhesive, each of which is resistant to the electrolyte used in the cell. For example, when the electrolyte is potassium hydroxide or sodium hydroxide, the tape carrier may be nylon or Mylar film or a woven polypropylene material, and the adhesive may be an acrylic or vinyl ether type adhesive.

The winding up of the separators 13 and the electrodes 11a and 11b on the mandrel 27 is carried out with margins of the separators projecting beyond the side edges of the narrower electrodes. The projecting margins of the separators at one end of the electrode assembly engage the base 25 of the arbor and become folded over the edges of the electrodes as shown in FIG. 1. The projecting margins of the separators at the top of the electrode assembly are folded over the other edges of the electrodes in suitable manner. As a result of folding over the margins of the separators, the upper and lower edges of the electrodes are well insulated from each other. The folded-over margins of the separators are held in folded-over condition by the base 25 of the arbor and by the disc 21, both of which are preferably of insulating material.

Disc 21 has two holes or openings 41 positioned to receive the conductors 15 and 17. These holes are in registry with slots 43 in the base portion of spacer 19. The disc and spacer are made from a suitable caustic-and/or acid-resistant material such as polypropylene or ethylene rubber, Hycar, Thiokol, neoprene, et cetera.

The electrode assembly 9 is placed in the container prior to application of the cover 3 and deformation of the upper end of the container. The electrode assembly is very nearly circular in shape and its outside diameter is slightly smaller than the inside diameter of the container 1 so that the electrode assembly is easily placed in the position shown in FIG. 1 with the base 25 of the arbor resting on the bottom 7 of the container. Then the conductor 15 is secured to the wall of the container. Spacer 19 is then positioned within the container, and the end of conductor 17 is positioned on the top of the spacer as shown in FIG 1. Next the cover 3 is placed on the spacer and the cover sealed to the top of the container. This can be accomplished in the manner disclosed in my copending patent application Ser. No. 513,978, filed Dec. 15, 1965, entitled, Sealed Electrical Cell. The spacer is compressed on the electrode assembly, holding the latter in place against shaking loose under acceleration or due to any cause, including vibration. A cap or button 45 is provided on cover 3 and used as a contact for taking electrical energy from the battery. A valve member 47 is provided between the cap 45 and the cover 3 to open and close communication between the container and the atmosphere through a hole 49, thereby preventing the build-up of excessive pressures in container 1 during charging and discharging of the cell. Valve member 47 and its operation are described in my copending patent application Ser. No. 518,219, filed Jan. 3, 1966, entitled, Electrical Cell.

In the assembled cell the spacer 19 fixes the position of the cover 3, reduces the possibility of shock damage to the cell by holding the parts in their assembled positions, and fixes the position of the electrode assembly in the cell, thereby preventing movement and potential short circuiting of the electrodes. Moreover, the spacer 19 aids in the automated assembly of the cells by locating cover 3 during the sealing of the cover to the container, and it also maintains terminal pressures on the electrode conductor 17 and occupies some empty volume within the cell. Spacer 19 is made of material such as the types previously mentioned which are resistant to the electrolyte being used. The spacer may be made of monocellular or multicellular sponge material and shaped to occupy either a maximum or a minimum cell volume. For example, the spacer can be ethylene propylene rubber or neoprene rubber. When the cell is being charged, oxygen gas is released which later recombines with the negative electrode. By designing the spacer to fill the maximum space in the cell, generation of oxygen gas is limited since there is little space for the gas to occupy and it quickly reaches a stabilizing pressure which would increase the recombination rate of the gas. On the other hand, the spacer can be designed to occupy a minimum cell volume so that the gas pressure is at a minimum. The particular shape of the spacer for these purposes is determined by the specific requirement of the electrodes and/or electrolyte. The spacer also can be used be used as a means for calibrating the shock load resistance of the cell along axis X—X by making the spacer of a given or determinable compressibility.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electrode assembly for an electrical cell comprising a mandrel having a periphery of spiral form providing a longitudinal offset shoulder on a substantially radial plane extending substantially throughout the length of said mandrel, alternating separator and electrode strips wound around said mandrel, the inner ends of said strips abutting said shoulder, and means holding the strips wound around the mandrel.

2. An electrode assembly as set forth in claim 1 wherein said holding means comprises adhesive insulating tape wrapped around the separator and electrode strips.

3. An electrode assembly as set forth in claim 1 including axially disposed lands on said shoulder, said lands being spaced to accept the ends of separator strips therebetween and the ends of electrode strips thereon.

4. An electrode assembly as set forth in claim 1 wherein the separator strips are wider than the electrode strips, and the margins of the separator strips project beyond and are folded over the edges of the electrode strips.

5. An electrode assembly as set forth in claim 1 including axially disposed lands on said shoulder, the lands being spaced to accept the ends of separator strips therebetween and the ends of electrode strips thereagainst, the separator strips being wider than the electrode strips, and the margins of said separator strips projecting beyond and being folded over the edges of the electrode strips.

6. An electrode assembly as set forth in claim 1 wherein the mandrel has a disc-shaped base portion at one end.

7. An electrode assembly for an electrical cell comprising an arbor having a base and an elongate mandrel projecting from the center of the base, the mandrel having a spiral periphery providing a longitudinal shoulder, the shoulder having two spaced recesses extending lengthwise thereof and forming two spaced lands, one of the lands being at the radially outer edge portion of the shoulder, a pair of flexible electrode strips having ends abutting the lands on the shoulder, and a pair of flexible separator strips having ends in the recesses in the shoulder, the strips being wound under compression around the mandrel, the separator strips being wider than the electrode strips and having their margins projecting beyond and folded around the edges of the electrode strips, and means holding the strips in their wound position on the mandrel.

8. An electrical cell comprising a conductive container having a bottom and a peripheral wall, an electrode assembly in the container, the electrode assembly comprising an elongate mandrel in the center portion of the container, the mandrel having a spiral periphery providing a longitudinal shoulder, the shoulder having two spaced recesses extending lengthwise thereof and forming two spaced lands, a pair of flexible electrode strips having ends abutting the lands on the shoulder, and a pair of flexible separator strips having ends in the recesses in the shoulder, one of the separator strips being between the electrode strips, the strips being wound around the mandrel and positioned between the mandrel and the container wall, means holding the strips in their wound position on the mandrel and insulating the electrode assembly from the container wall, a cover sealed to the container wall and insulated from the container wall, and means providing a conductive path from one of the electrode strips to the cover and from the other electrode strip to the container wall.

9. An electrical cell as set forth in claim 8 further comprising means interposed between the cover and the electrode assembly holding the assembly against the bottom of the container.

10. An electrical cell comprising a conductive container having a bottom and a generally cylindrical peripheral wall, an electrode assembly in the container, the assembly comprising an arbor of insulating material having a circular base positioned on the container bottom and an elongate mandrel projecting from the center of the base coaxial with the container wall, the mandrel having a spiral periphery providing a longitudinal shoulder, the shoulder having two spaced recesses extending lengthwise thereof and forming two spaced lands, one of the lands being at the radially outer edge portion of the shoulder, a pair of flexible electrode strips having ends abutting the lands on the shoulder and a pair of flexible separator strips having ends in the recesses in the shoulder, one of the separator strips being between the electrode strips, the strips being wound around the mandrel and substantially filling the space between the mandrel and the container wall, the separator strips being wider than the electrode strips and having their margins projecting beyond and folded around the edges of the electrode strips, the separator strips at one end of the electrode assembly abutting the arbor base, a disc engaging the margins of the separator strips at the other end of the electrode assembly, means holding the strips in their wound position on the mandrel, the holding means insulating the electrode assembly from the container wall, a conductive cover sealed to the container wall and insulated from the container wall, a spacer between the cover and the disc, and conductors connecting one of the electrode strips to the cover and the other electrode strip to the container wall.

References Cited

UNITED STATES PATENTS 3,116,172  12/1963  Wilke et al. _____ 136—107

FOREIGN PATENTS 579,849  8/1946  Great Britain.

ALLEN B. CURTIS, *Primary Examiner.*

C. F. LE FEVOUR, *Assistant Examiner.*